United States Patent [19]
Sore et al.

[11] Patent Number: 6,044,572
[45] Date of Patent: Apr. 4, 2000

[54] PIPE RULER

[76] Inventors: John D. Sore; John D. Sore, Jr., both of 20 Penn Blvd., Scarsdale, N.Y. 10583

[21] Appl. No.: 08/985,417

[22] Filed: Dec. 4, 1997

[51] Int. Cl.[7] ............................................. G01B 3/10
[52] U.S. Cl. .......................... 33/555.4; 33/759; 33/529; 33/679.1; 33/542
[58] Field of Search ........................ 33/555.4, 555.1, 33/755, 759, 529, 542, 544, 494, 679.1, 483

[56] References Cited

U.S. PATENT DOCUMENTS

| | | | |
|---|---|---|---|
| 1,497,492 | 6/1924 | Engel | 33/494 |
| 2,637,114 | 5/1953 | McHugh | 33/529 |
| 3,407,507 | 10/1968 | Brubaker | 33/755 |
| 4,811,489 | 3/1989 | Walker | 33/529 |

*Primary Examiner*—Christopher W. Fulton

[57] ABSTRACT

An apparatus is provided for determining a type of insulation for a first pipe and a second pipe having a first predetermined cross-sectional wall thickness a second predetermined cross-sectional wall thickness, respectively. The apparatus includes a ruler sheet having a bar situated thereon. Also provided is a pair of scales each including a plurality apertures formed therein through the ruler sheet and a unique inner diameter indicia situated adjacent each aperture. Such pair of scales include a copper tube scale and a iron pipe scale situated on the ruler sheet. The apertures of each scale are offset a predetermined amount to compensate for the difference between the first and second predetermined cross-sectional wall thickness.

10 Claims, 2 Drawing Sheets ents tapes and more particularly pertains to a new pipe ruler
PIPE RULER

BACKGROUND OF THE INVENTION

1. Field of the Invention

The present invention relates to pipe and fitting measurement tapes and more particularly pertains to a new pipe ruler for determining an inner diameter of a copper or iron pipe which have dissimilar cross-sectional wall thicknesses so that a pipe size and fitting number of an insulation may be ascertained.

2. Description of the Prior Art

The use of pipe measurement devices is known in the prior art. More specifically, pipe measurement devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art pipe measurement devices include U.S. Pat. No. 4,811,489; U.S. Pat. No. 4,922,622; U.S. Pat. Des. 260,738; U.S. Pat. No. 5,428,903; U.S. Pat. No. 4,574,487; and U.S. Pat. No. 4,149,320.

In these respects, the pipe ruler according to the present invention substantially departs from the conventional concepts and designs of the prior art, and in so doing provides an apparatus primarily developed for the purpose of determining an inner diameter of a copper or iron pipe which have dissimilar cross-sectional wall thicknesses so that a pipe size and fitting number of an insulation may be ascertained.

SUMMARY OF THE INVENTION

In view of the foregoing disadvantages inherent in the known types of pipe measurement devices now present in the prior art, the present invention provides a new pipe ruler construction wherein the same can be utilized for determining an inner diameter of a copper or iron pipe which have dissimilar cross-sectional wall thicknesses so that a pipe size and fitting number of an insulation may be ascertained.

The general purpose of the present invention, which will be described subsequently in greater detail, is to provide a new pipe ruler apparatus and method which has many of the advantages of the pipe measurement devices mentioned heretofore and many novel features that result in a new pipe ruler which is not anticipated, rendered obvious, suggested, or even implied by any of the prior art pipe measurement devices, either alone or in any combination thereof.

To attain this, the present invention generally comprises a copper pipe having a first predetermined cross-sectional wall thickness and a predetermined inner diameter. Associated therewith is an iron pipe having a second predetermined cross-sectional wall thickness and a predetermined inner diameter. As shown in the Figures, a flexible, inelastic, smooth and planar ruler sheet is provided having a rectangular configuration with a periphery. Such periphery is defined by a pair of elongated parallel edges and a pair of short parallel edges formed therebetween. The ruler sheet includes a colored bar situated adjacent to and in parallel with one of the short parallel edges. Next provided is a pair of scales situated on a corresponding bold primary line having a color similar to that of the colored bar. A pair of thin secondary lines are situated in parallel with the primary line and adjacent thereto. Situated at various increments along the lines are a plurality of oval shaped sections. Each section has an aperture formed therein through the ruler sheet and adjacent to the bold line. A unique inner diameter indicia is situated within each of the sections which is representative of the inner diameter of the corresponding pipe. A unique first fitting number indicia, corresponding to a first insulation thickness, is also situated within each of the sections and is further adjacent to a first one of the second lines. Also situated within each of the sections is a unique second fitting number indicia which corresponds to a second insulation thickness and which resides adjacent to a second one of the second lines. The scales include a copper tube scale situated adjacent a first one of the elongated parallel edges of the ruler sheet and a iron pipe scale situated adjacent a second one of the elongated parallel edges of the ruler sheet. It should be noted that the sections of each scale that have identical inner circumference indicia are offset a predetermined amount.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced mind carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pipe ruler apparatus and method which has many of the advantages of the pipe measurement devices mentioned heretofore and many novel features that result in a new pipe ruler which is not anticipated, rendered obvious, suggested, or even implied by any of the prior art pipe measurement devices, either alone or in any combination thereof.

It is another object of the present invention to provide a new pipe ruler which may be easily and efficiently manufactured and marketed.

It is a further object of the present invention to provide a new pipe ruler which is of a durable and reliable construction.

An even further object of the present invention is to provide a new pipe ruler which is susceptible of a low cost of manufacture with regard to both materials and labor, and which accordingly is then susceptible of low prices of sale to the consuming public, thereby making such pipe ruler economically available to the buying public.

Still yet another object of the present invention is to provide a new pipe ruler which provides in the apparatuses and methods of the prior art some of the advantages thereof, while simultaneously overcoming some of the disadvantages normally associated therewith.

Still another object of the present invention is to provide a new pipe ruler for determining an inner diameter of a copper or iron pipe which have dissimilar cross-sectional wall thicknesses so that a pipe size and fitting number of an insulation may be ascertained.

Even still another object of the present invention is to provide a new pipe ruler that includes an apparatus for determining a type of insulation for a first pipe and a second pipe having a first predetermined cross-sectional wall thickness a second predetermined cross-sectional wall thickness, respectively. The apparatus includes a ruler sheet having a bar situated thereon. Also provided is a pair of scales each including a plurality apertures formed therein through the ruler sheet and a unique inner diameter indicia situated adjacent each aperture. Such pair of scales include a copper tube scale and a iron pipe scale situated on the ruler sheet. The apertures of each scale are offset a predetermined amount to compensate for the difference between the first and second predetermined cross-sectional wall thickness.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
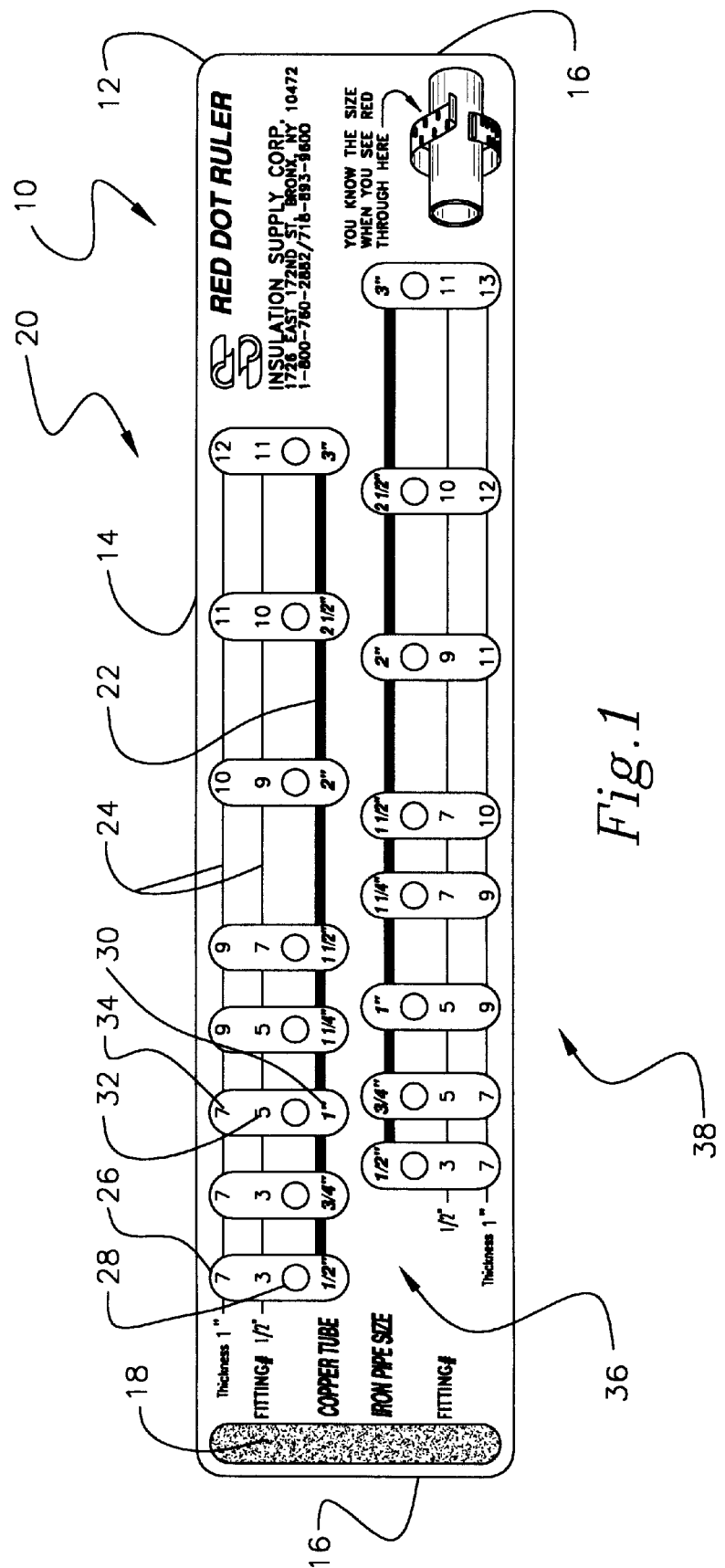
FIG. 1 is a front view of a new pipe ruler according to the present invention.
Figure 2:
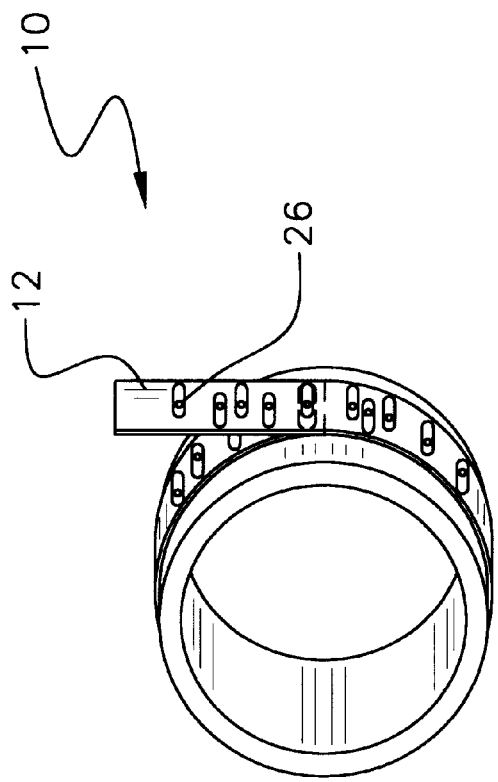
FIG. 2 is a perspective view of the present invention in use.
Figure 3:
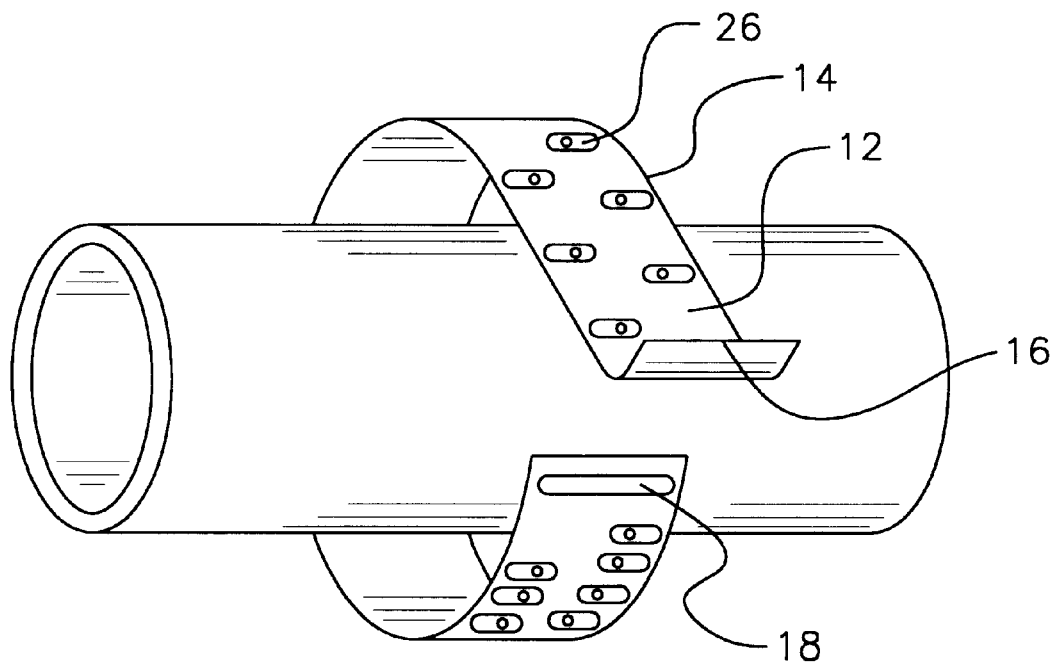
FIG. 3 is another perspective view of the present invention during use.

With reference now to the drawings, and in particular to FIGS. 1 through 3 thereof, a new pipe ruler embodying the principles and concepts of the present invention and generally designated by the reference numeral 10 will be described.

The present invention, as designated as numeral 10, includes a copper pipe having a first predetermined cross-sectional wall thickness and a predetermined inner diameter. Associated therewith is an iron pipe having a second predetermined cross-sectional wall thickness and a predetermined inner diameter. In the foregoing cases, an outer diameter of the pipes is equal to the inner diameter plus the cross-sectional wall thickness times two. Further, such cross-sectional wall thicknesses are standard. It should be noted that a plastic and stainless steel pipe may be employed in lieu of the aforementioned pipes.

As shown in the Figures, a flexible, inelastic, smooth and planar ruler sheet 12 is provided having a rectangular configuration with a periphery. Such periphery is defined by a pair of elongated parallel edges 14 and a pair of short parallel edges 16 formed therebetween. The ruler sheet includes a colored bar 18 situated adjacent to and in parallel with one of the short parallel edges. Such bar has a length approximately equal to that of the short parallel edge.

Next provided is a pair of scales 20 situated on a corresponding bold primary line 22 having a color similar to that of the colored bar. A pair of thin secondary lines 24 of a dissimilar color with respect to the bold primary line are situated in parallel with the primary line and adjacent thereto. Situated at various increments along the lines are a plurality of oval shaped sections 26. Each section has an aperture 28 formed therein through the ruler sheet and adjacent to the bold line.

A unique inner diameter indicia 30 is situated within each of the sections which is representative of the inner diameter of the corresponding pipe. A unique first fitting number indicia 32, corresponding to a first insulation thickness, is also situated within each of the sections and is further adjacent to a first one of the second lines. Also situated within each of the sections is a unique second fitting number indicia 34 which corresponds to a second insulation thickness and which resides adjacent to a second one of the second lines.

The scales include a copper tube scale 36 situated adjacent a first one of the elongated parallel edges of the ruler sheet and a iron pipe scale 38 situated adjacent a second one of the elongated parallel edges of the ruler sheet. It should be noted that the sections of each scale that have identical inner circumference indicia are offset a predetermined amount. Such spacing is due to the fact that each scale takes into account the fixed thickness of the corresponding type of pipe and properly indicates the appropriate inner diameter.

During use, the ruler sheet may be encompassed about an outer surface of the copper or iron pipes such that the aperture of one of the sections of the corresponding scale is situated over the colored bar. Pipe size and fitting numbers for an insulation of a desired thickness may then be ascertained from the section in which the aperture is situated over the colored bar. It should be noted that the numbers indicated in the various Figures are merely illustrative and that a ruler sheet may be constructed that has a greater length, additional apertures and a measurement indicia.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An apparatus for determining a size of insulation for an iron or copper pipe comprising:

a flexible, inelastic, smooth and planar ruler sheet having a rectangular configuration with a periphery defined by a pair of elongated parallel edges and a pair of short parallel edges formed therebetween, the ruler sheet having a colored bar situated adjacent to and in parallel with one of the short parallel edges; and a pair of scales each including a bold primary line having a color similar to that of the colored bar, a pair of thin secondary lines situated in parallel with the primary line and adjacent thereto, and a plurality of sections situated at various increments along the lines, each section having an aperture formed therein through the ruler sheet and adjacent to the primary line, a pipe size and unique inner diameter indicia situated within each of the sections, a unique first fitting number indicia, corresponding to a first insulation thickness, situated within each of the sections adjacent to a first one of the secondary lines, and a unique second fitting number indicia, corresponding to a second insulation thickness, situated with each of the sections adjacent to a second one of the secondary lines;

said pair of scales including a copper tube scale situated adjacent a first one of the elongated parallel edges of the ruler sheet and a iron pipe scale situated adjacent a second one of the elongated parallel edges of the ruler sheet, wherein the sections of each scale that have identical inner circumference indicia are offset a predetermined amount;

whereby the ruler sheet may be encompassed at least one of the copper and iron pipes such that the aperture of one of the sections of the corresponding scale is situated over the colored bar, whereby fitting numbers associated with said aperture resides in the section wherein the fitting numbers of the first and second insulation thickness may be ascertained from the section in which said aperture is situated over the colored bar.

2. An apparatus for determining the thickness of pipe insulation associated with a pipe, the apparatus comprising:

a ruler sheet having a bar situated thereon;

a pair of scales each including a plurality of apertures formed therein through the ruler sheet and each having a unique inner diameter indicia situated adjacent each aperture;

said pair of scales including a tube scale and a pipe scale situated on the ruler sheet, each of the scales extending from the bar on the ruler sheet, wherein the apertures of each scale are offset from the bar by a distance based upon the value of the inner diameter indicia associated with the aperture, wherein adjacent apertures on each scale are separated by a series of spacings, wherein the spacings between adjacent apertures of each scale are unequal from other spacings of the scale.

3. An apparatus as set forth in claim 2 wherein the bar is colored and the apertures reside along a bold colored line.

4. An apparatus as set forth in claim 2 and further including a unique pipe size and fitting number indicia, corresponding to an insulation thickness, situated adjacent to the corresponding inner diameter indicia.

5. An apparatus as set forth in claim 4 further including a unique pipe size and second fitting number indicia, corresponding to a second insulation thickness, situated adjacent to the corresponding inner diameter indicia.

6. An apparatus as set forth in claim 2 wherein the ruler sheet is flexible, inelastic, smooth and planar.

7. The apparatus of claim 2 wherein each of the apertures is circular.

8. The apparatus of claim 7 wherein the bar has a width measured in a direction parallel to the extent of each of the scales, and wherein the diameter of each aperture is less than the width of the bar such that the bar may be viewed through only one aperture of the scale at a time.

9. An pipe measurement apparatus comprising:

a ruler sheet having a bar situated thereon; and at least one scale including a plurality of apertures formed therein through the ruler sheet and each having a unique measurement indicia situated adjacent each aperture;

the scale extending from the bar on the ruler sheet, wherein the apertures of the scale are offset from the bar by a distance based upon the value of the inner diameter indicia associated with the aperture, wherein adjacent apertures on the scale are separated by a series of spacings, wherein the spacings between adjacent apertures of each scale are unequal from other spacings of the scale.

10. An apparatus for determining a size of insulation for a pipe comprising:

a flexible, inelastic, planar ruler sheet having a periphery defined by a pair of elongated edges and a pair of short edges formed therebetween, the ruler sheet having a colored bar situated adjacent to and in parallel with one of the short parallel edges; and a pair of scales each including a primary line having a color similar to that of the colored bar, a pair of secondary lines situated in parallel with the primary line and adjacent thereto, and a plurality of sections situated at various increments along the lines, each section having an aperture formed therein through the ruler sheet and adjacent to the primary line, a pipe size and unique inner diameter indicia situated in each of the sections, a unique first fitting number indicia, corresponding to a first insulation thickness, situated in each of the sections adjacent to a first one of the secondary lines, and a unique second fitting number indicia, corresponding to a second insulation thickness, situated with each of the sections adjacent to a second one of the secondary lines;

said pair of scales including a copper tube scale situated adjacent a first one of the elongated edges of the ruler sheet and a iron pipe scale situated adjacent a second one of the elongated edges of the ruler sheet, wherein the sections of each scale that have identical inner circumference indicia are offset a predetermined amount;

whereby the ruler sheet may be wrapped circumferentially about a pipe such that the aperture of one of the sections of the corresponding scale is situated over the colored bar, whereby fitting numbers associated with said aperture resides in the section wherein the fitting numbers of the first and second insulation thickness may be ascertained from the section in which said aperture is situated over the colored bar.

* * * * *